Aug. 30, 1955   F. ALEXANDER   2,716,712
HIGH VOLTAGE INDICATOR
Filed Oct. 16, 1952

FOCSANEANU ALEXANDER
*INVENTOR.*

BY *Ralph E. Bitner*

ATTORNEY

United States Patent Office 2,716,712
Patented Aug. 30, 1955

2,716,712

HIGH VOLTAGE INDICATOR

Focsaneanu Alexander, Flushing, N. Y.

Application October 16, 1952, Serial No. 315,087

2 Claims. (Cl. 313—110)

This invention relates to voltage indicators and has particular reference to the construction and arrangement of a gaseous discharge tube for indicating the presence of voltages between 400 and 30,000 volts.

Many voltage indicators have been used in the past to indicate the presence of high voltage. Most of these indicators required the use of two conductors, one conductor making contact with the circuit element whose voltage is in question and the other conductor connected to ground. Another prior art indicator used a gaseous discharge tube having two electrodes, only one of which was connected to the circuit element to be tested. Such an arrangement, while convenient and easy to use, was not sensitive and was capable of giving an indication for voltages between 1,000 volts and over. This form of indicating device had the added disadvantage of frequently becoming totally insensitive due to loss of vacuum or change in gas pressure so that the protective feature of the device was lost.

The present invention comprises a monopolar gaseous discharge tube having a small drop of mercury inside the envelope. Due to the electrode construction the device lights up when connected to conductors charged to voltage values as small as 400 volts. The device includes an added protective feature which enables the operator to determine whether the gas pressure within the envelope is the correct amount. By merely shaking the tube, the mercury drop excites the rarefied gas and produces a pattern of light which is different from that produced by the application of impressed voltages.

One of the objects of this invention is to provide an improved voltage indicator which avoids one or more of the disadvantages and limitations of prior art arrangements.

Another object of the invention is to simplify and improve the construction of voltage testing devices.

Another object of the invention is to provide a voltage tester which is considerably more sensitive than prior monopolar devices.

Another object of the invention is to provide a gaseous discharge voltage testing device which affords maximum protection to the operator.

Another object of the invention is to provide a device for testing voltages which itself can be tested easily and quickly by the operator.

The invention includes a long hollow cylindrical insulator having a conductive probe secured at one end. A monopolar lamp is connected to the probe and is enclosed within the walls of the cylinder. The lamp is viewed through the hollow portion of the cylinder and contains within its envelope a small drop of mercury and an inert gas.

One feature of the invention includes a single electrode within the envelope of the gaseous discharge tube and is mounted within a small enclosing glass tube, axially aligned with the tubular envelope. Another feature of the invention includes a small lens section mounted at the viewing end of the tube envelope which presents a definite and recognizable light pattern when viewed through the hollow insulator handle. Another feature of the invention includes a joint in the insulator handle which permits the operator to reduce the size of the device by unscrewing two parts of the handle, inserting the smaller part within the larger and then screwing them together again.

For a better understanding of the present invention, together with other and further objects thereof, reference is made to the following description taken in connection with the accompanying drawings.

Figure 1:
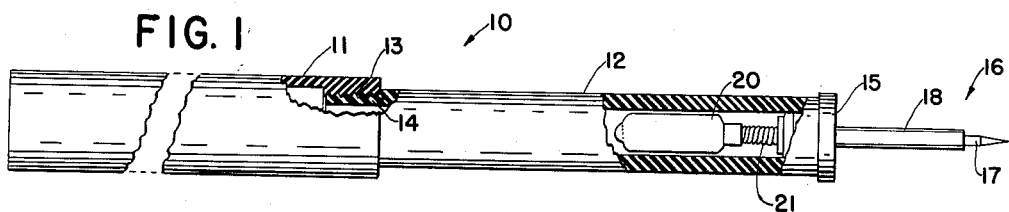
Fig. 1 is a side view of the indicator with some parts in section showing the entire voltage testing device.

Referring now to the drawings, Figs. 1 to 4, an insulating handle 10 is made up of two hollow cylindrical sections, 11 and 12. Section 11 is formed with a screw thread 13 at one end thereof and receives a threaded portion 14 at one end of cylinder 12. It should be noted that thread 13 is formed on an inside surface of handle 11 which is considerably smaller than the diameter of the remainder of the hollow portion. This permits the telescoping of parts 11 and 12 by unscrewing the threaded portions, reversing the larger handle 11, and reinserting insulator 12 into the hollow portion of handle 11 and again screwing the two portions together.

At the outer extremity of insulator 12 a plug 15 is positioned having an extended portion 16 which consists of a conductor 17 surrounded by an insulating sleeve 18. A lamp 20 is mounted on the inside of insulator 12 and is coupled to the end conductor 17 by a spring coupling 21. When this device is operated, the operator connects the tip of conductor 17 to the circuit element to be tested and views the lamp through the hollow portions of handle 11 and insulator 12.

Figure 2:
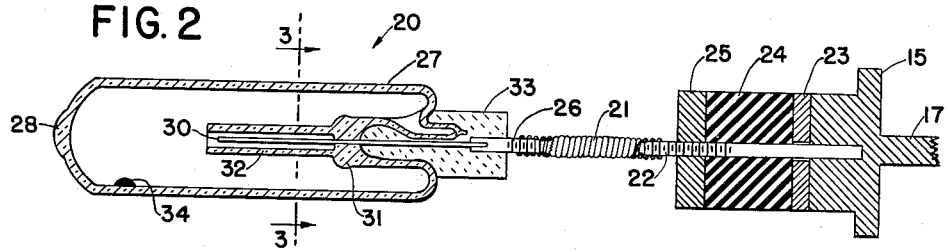
Fig. 2 is a cross sectional view of the gas-filled lamp together with the connecting plug.
Figure 3:
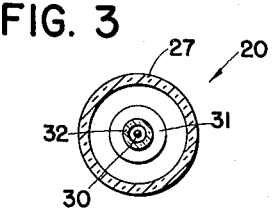
Fig. 3 is a cross sectional view of the lamp of Fig. 2 taken along line 3—3 of that figure.
Figure 4:
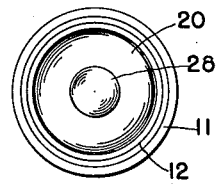
Fig. 4 is an end view of the device shown in Fig. 1.
Figure 5:
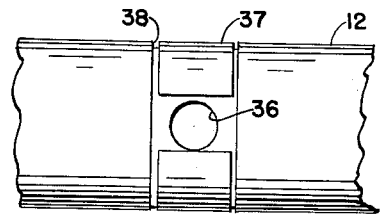
Fig. 5 is a side view of an alternate form of the insulating handle.
Figure 6:
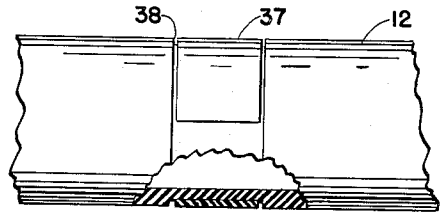
Fig. 6 is a side view similar to Fig. 5 but showing some parts in section.

Fig. 2 shows the details of the lamp 20 and the plug arrangement 15. A central rod 22 is secured to the plug 15 and a metallic washer 23, a rubber plug 24, and a second washer 25 having a screw thread at its center, are all placed on the rod 22. This construction permits an easy and convenient method of securing the plug components in the end of insulator 12. Washer 25 is first adjusted on the screw thread so that the rubber 24 bulges a slight amount so as to make a sliding fit on the inside of cylinder 12. Then plug 15 is turned by hand to further engage washer 25 and cause the rubber plug 24 to be extended and produce a firm, nonslidable contact with the end of the cylinder.

A flexible spring 21 is secured to the end of threaded rod 22 by soldering or any other means desirable. The other end of spring 21 is secured in like manner to a similar rod 26.

Lamp 20 comprises an envelope 27 formed with a lens portion 28 at one end. A single electrode 30 is axially aligned with the tube envelope and is held in place by a press seal 31. An enclosing cylinder of glass 32 is secured to the press 31 and surrounds the electrode 30 leaving only a small space between the inside surface of tube 32 and the electrode 30. The external portion of electrode 30 is soldered to screw 26 and a cylinder of cement 33 is placed around the joint for protective purposes. Envelope 27 is filled with a suitable gas at reduced pressure which may be a mixture of neon and argon at a pressure of about 10 mm. of mercury. In addition to the gas a small drop of mercury 34 is placed inside the envelope.

The operation of this device is as follows: After the two cylindrical portions have been joined by their screw threads 13, 14 and the plug 15 is secured in place, the operator touches conductor 17 to the circuit element which is believed to be charged to a high potential. The operator looks through the hollow portions of the two cylinders and if a voltage of 400 volts or over is impressed on conductor 17, the lamp 20 will be lighted and the operator will then see a central portion of light focused by section 23 and a ring of light which is formed at the junction of the cylindrical glass envelope and the end section of the lamp. This pattern of light assures the observer that a voltage of 400 volts or more has been applied to tip 17. In the event that no light is visible at all the observer may then test the lamp by shaking it slightly. The shaking motion causes drop 34 to generate sufficient static electricity to cause the gas within the envelope to be ionized and produce light. The light produced by this shaking motion is quite different from the light produced by the voltage applied to electrode 30 and consists of irregular streaks of light constantly changing in pattern and having no definite configuration. As long as the lamp shows these irregular flashes on shaking and shows no light when applied to a conductor the operator may be assured that no voltage has been applied to tip 17 over 400 volts.

There may be times when it is inconvenient to look through the hollow portions of cylinders 11 and 12. Under these circumstances the operator may look through a small hole 36 in cylinder 12 placed opposite the lamp 20. This hole may be closed for ordinary viewing by an insulating shell 37 which fits around a channeled portion 38 of cylinder 12. The shell 37 can be turned so as to cover opening 36 and prevent light from entering the hollow portion of the insulator.

From the above description it will be evident that the invention provides a safe, convenient means for testing the voltage on circuit elements above 400 volts. The configuration of the lamp envelope gives a visible indication to the operator that the tube is in operating condition and has sensed a high voltage conductor.

While there have been described and illustrated specific embodiments of the invention, it will be obvious that various changes and modifications may be made therein without departing from the field of the invention which should be limited only by the scope of the appended claims.

I claim:

1. A monopolar high voltage indicator for sensing the presence of high voltage comprising: a hollow cylindrical support made of insulating material; a gaseous discharge lamp mounted within said support adjacent to one of its ends; said lamp including a single rod-type electrode within an envelope, an ionizable gas at reduced pressure and a globule of mercury within the envelope, an open-ended insulating tube surrounding said electrode, and a lens section formed integral with said envelope partially covering one end thereof; a conductive probe which extends beyond the end of the cylindrical support and is connected to the single electrode in the lamp; and viewing means for observing the lamp through the cavity formed by the hollow cylindrical support.

2. A monopolar high voltage indicator in accordance with claim 1 wherein the electrode, the open-ended insulating tube, and the lens section are all in axial alignment with the cylindrical support whereby a definite and distinctive light pattern is produced when high voltage is applied to the conductive probe.

References Cited in the file of this patent
UNITED STATES PATENTS

| Number | Name | Date |
|---|---|---|
| 1,559,769 | Otto | Nov. 3, 1925 |
| 1,712,996 | Hoffman | May 14, 1929 |
| 1,900,577 | Moore | Mar. 7, 1933 |
| 1,906,119 | Spencer | Apr. 25, 1933 |
| 2,002,551 | Schmierer | May 28, 1935 |
| 2,053,164 | Pipkin | Sept. 1, 1936 |
| 2,081,767 | Richter | May 25, 1937 |